No. 757,622. PATENTED APR. 19, 1904.
H. F. JAMES.
WINDING OR HOISTING DRUM.
APPLICATION FILED NOV. 28, 1902.
NO MODEL.

WITNESSES
Chas Phipps
Edward Hamer

INVENTOR
Henry F. James
BY E. R. Inman
ATTORNEY

No. 757,622. Patented April 19, 1904.

UNITED STATES PATENT OFFICE.

HENRY F. JAMES, OF FRANKLIN, PENNSYLVANIA.

WINDING OR HOISTING DRUM.

SPECIFICATION forming part of Letters Patent No. 757,622, dated April 19, 1904.

Application filed November 28, 1902. Serial No. 133,142. (No model.)

*To all whom it may concern:*

Be it known that I, HENRY F. JAMES, a citizen of the United States, residing at Franklin, in the county of Venango and State of Pennsylvania, have invented certain new and useful Improvements in Winding or Hoisting Drums, of which the following is a specification, reference being had therein to the accompanying drawings.

My invention relates to improvements in drums for windlasses, capstans, cranes, and like hoisting devices and will be fully understood by reference to the accompanying drawings, in which—

Figure 2:
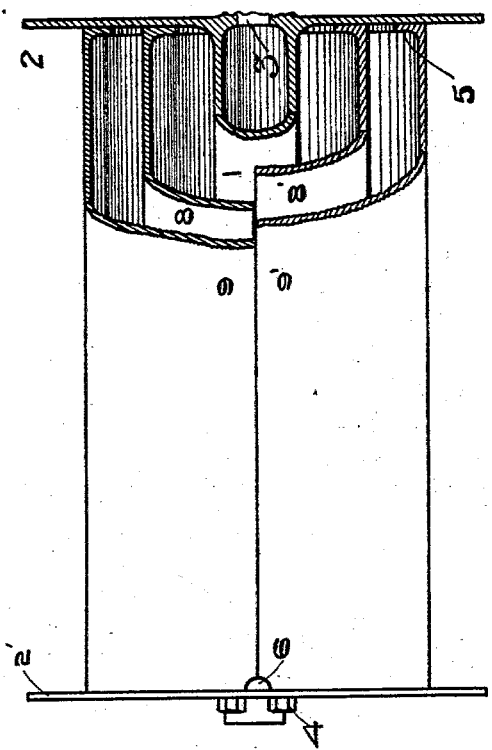
Figure 3:
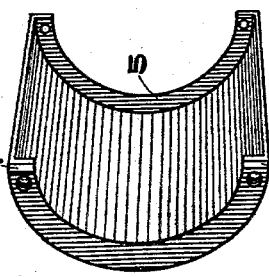
Figure 1:
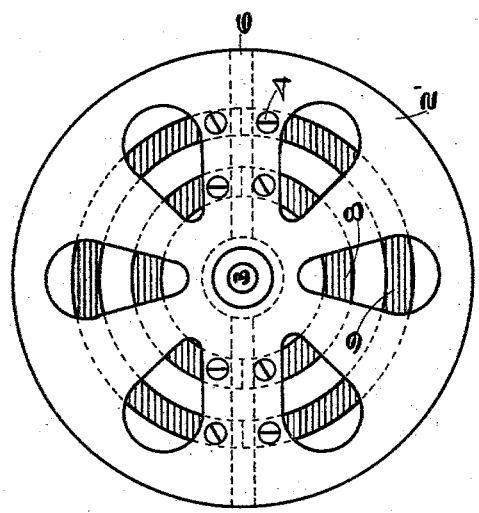

Figure 1 is an end elevation. Fig. 2 is a side elevation, parts being shown in section. Fig. 3 is a perspective view of a shell or portion of lagging.

In said drawings the same reference-symbols indicate identical parts in the several views.

My device consists of a primary drum comprised of a body 1, having at each end thereof a head 2 and 2'. Said body has formed therein a suitable bearing 3 for the reception of a shaft or axle, and thus constructed my drum is substantially of the form in common use in machines of the class named; but it often becomes desirable to increase the diameter of a drum for various reasons, and it is with a view of supplying a drum of variable diameter that my device has been conceived.

For the purpose of varying the diameter of my drum I provide semicylindrical shells, Fig. 3, adapted to fit between heads 2 and 2' of my drum and to be secured in place by screws or bolts 4, passing through the flanges 5. For the purpose of protecting said bolts or screws from detrusion I form a radial bead 6 upon the inside of the heads 2 and 2', and in the flanges 5 at their juxtaposed edges is formed a recess 7 to conform to said bead or receive same, so that when the drum is revolved the strain of traction upon the periphery is sustained largely by the radial beads 6, and thus the screws 4 are largely relieved of a shearing strain which would be otherwise exerted upon them. Thus, be it understood, that should a drum of larger diameter be desired than that afforded by the body 1 the shells 8 and 8' could be attached, and if a still larger drum is desired the shells 9 and 9' could be attached, each set of shells being secured in position by screws or bolts 4, which may be quickly removed when occasion requires.

Having thus described my device, what I claim as new, and desire to secure by Letters Patent, is—

In a hoisting or winding drum, a primary drum having a flange at each end thereof, radial beads upon said flanges, holes formed in said flanges adapted for the reception of bolts or screws, in combination with semicylindrical shells, having a flange at each end thereof adapted to be received between the flanges of the primary drum, and be attached thereto by means of screws or bolts, means of relieving the shearing strain upon said bolts or screws, substantially as specified.

In testimony whereof I affix my signature in presence of two witnesses.

HENRY F. JAMES.

Witnesses:
 CHARLES H. HOLLISTER,
 BERTHA J. HOLLISTER.